H. F. POPE.
DRAFT GEAR.
APPLICATION FILED APR. 9, 1907.
1,062,252.
Patented May 20, 1913.
8 SHEETS—SHEET 1.
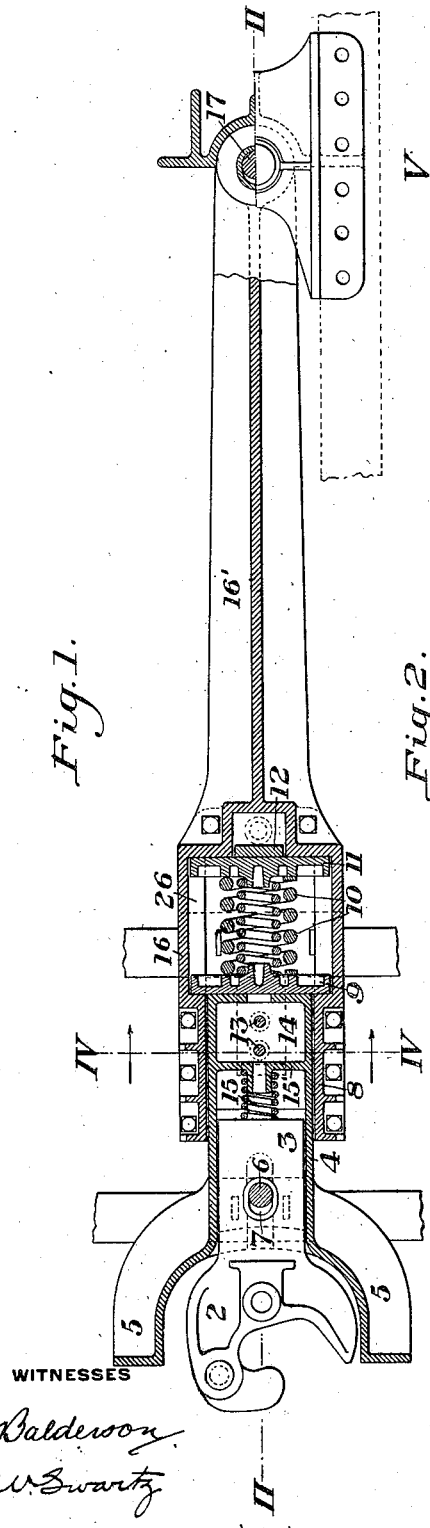
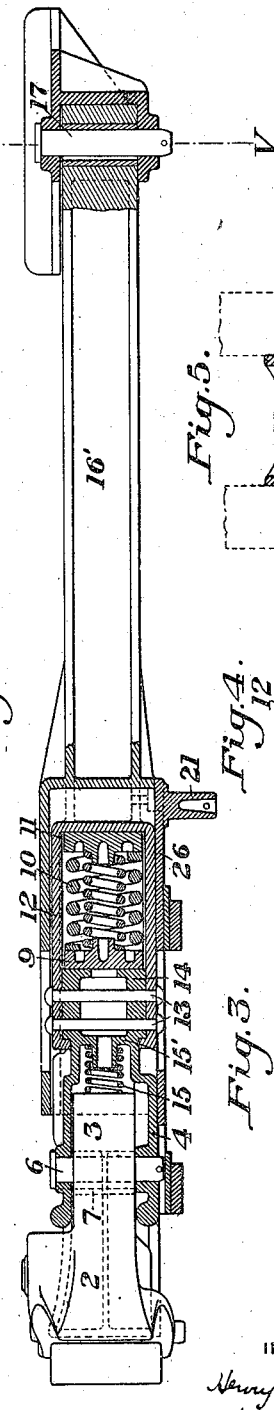
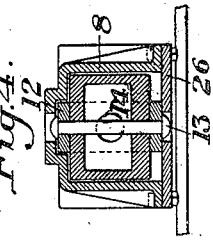
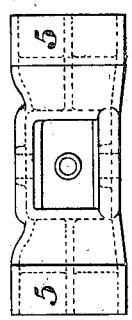
WITNESSES
R A Balderson
W W Swartz
INVENTOR
Henry F. Pope
by Bakewell Byrnes
his attys H. F. POPE.
DRAFT GEAR.
APPLICATION FILED APR. 9, 1907.
1,062,252.
Patented May 20, 1913.
8 SHEETS—SHEET 2.
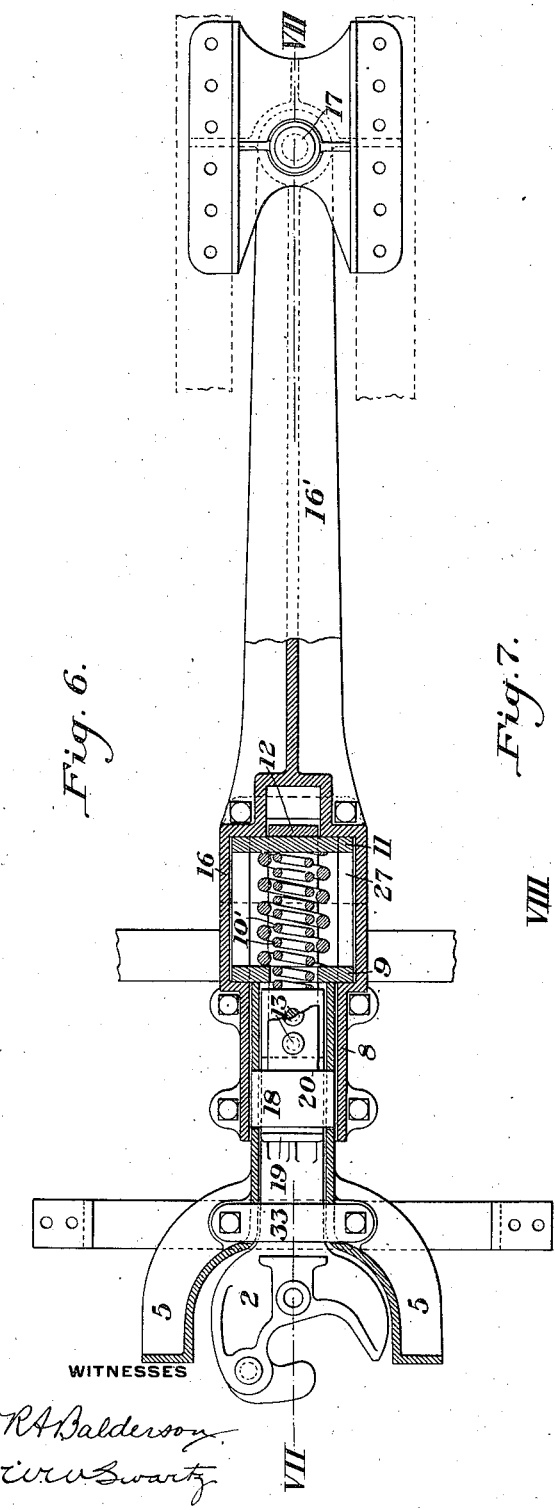
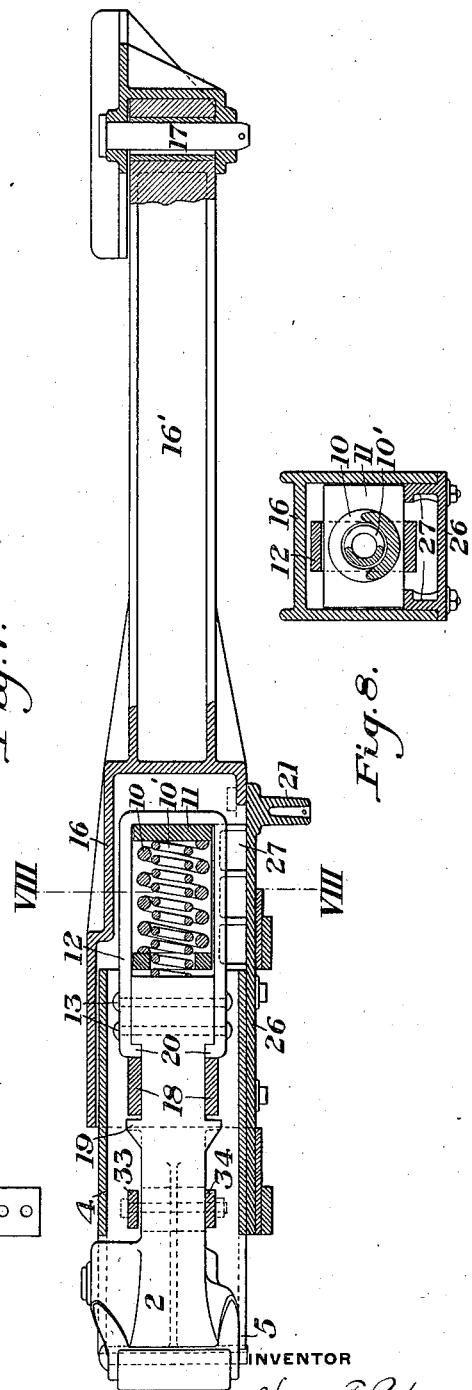
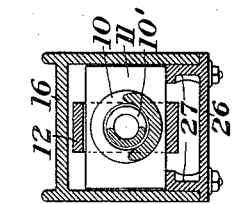

H. F. POPE.
DRAFT GEAR.
APPLICATION FILED APR. 9, 1907.
1,062,252.
Patented May 20, 1913.
8 SHEETS—SHEET 3.
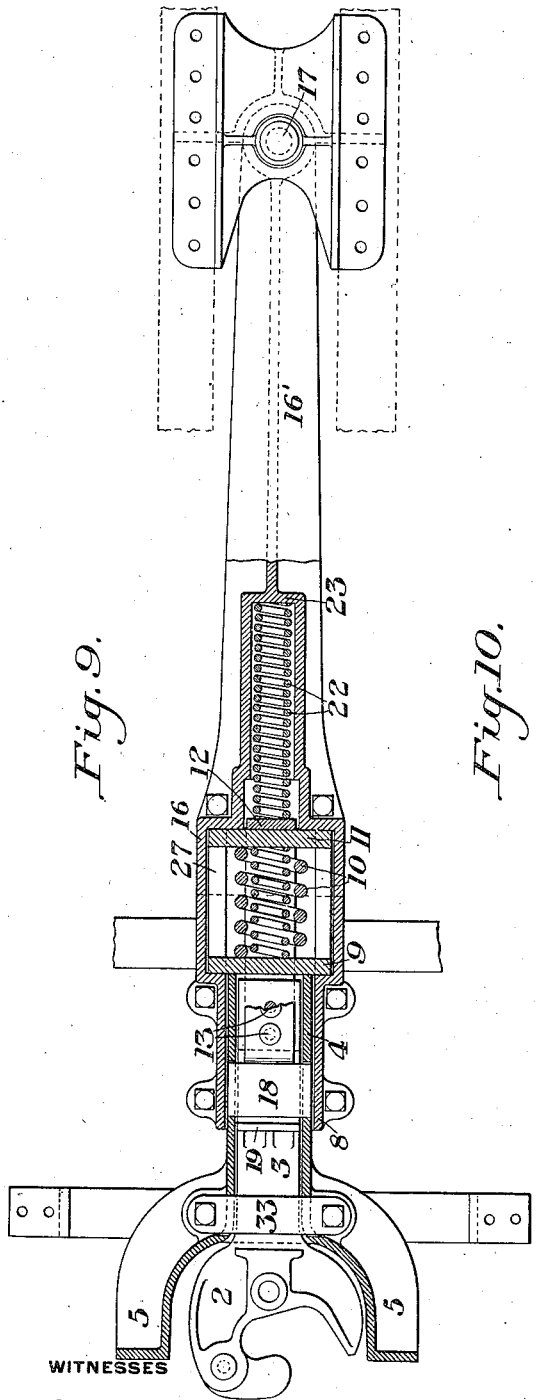
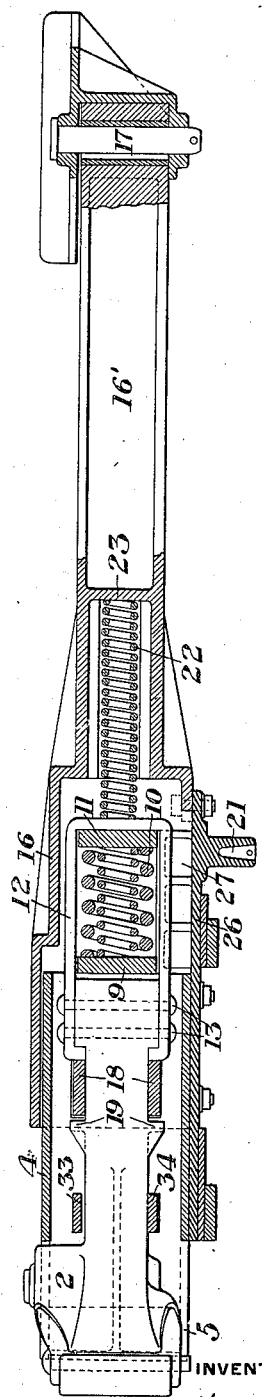

H. F. POPE.
DRAFT GEAR.
APPLICATION FILED APR. 9, 1907.
1,062,252.
Patented May 20, 1913.
8 SHEETS—SHEET 4.
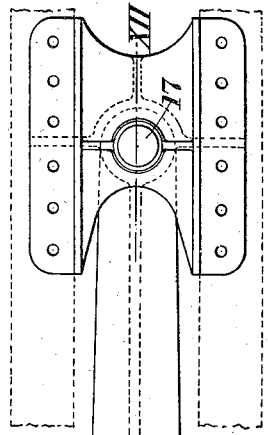
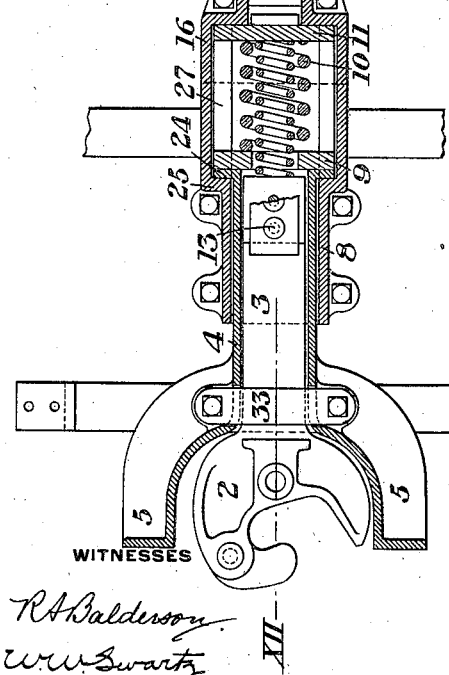
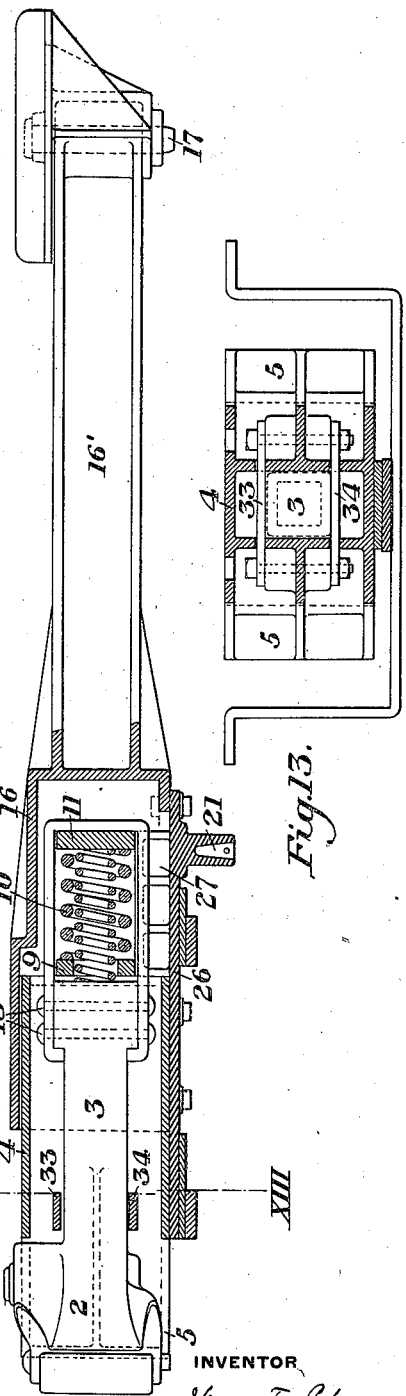
WITNESSES
R. A. Balderson
W. W. Swartz
INVENTOR
Henry F. Pope
by Bakewell & Byrnes
his attys

H. F. POPE.
DRAFT GEAR.
APPLICATION FILED APR. 9, 1907.

1,062,252.

Patented May 20, 1913.

8 SHEETS—SHEET 5.

WITNESSES
R. A. Balderson,
Walter Tamarisz

INVENTOR
Henry F. Pope
by Bakewell & Byrnes
his attys

H. F. POPE.
DRAFT GEAR.
APPLICATION FILED APR. 9, 1907.

1,062,252.

Patented May 20, 1913.
8 SHEETS—SHEET 6.

WITNESSES
R A Balderson
W W Swartz

INVENTOR
Henry F. Pope
by Bakewell Byrnes
his attys

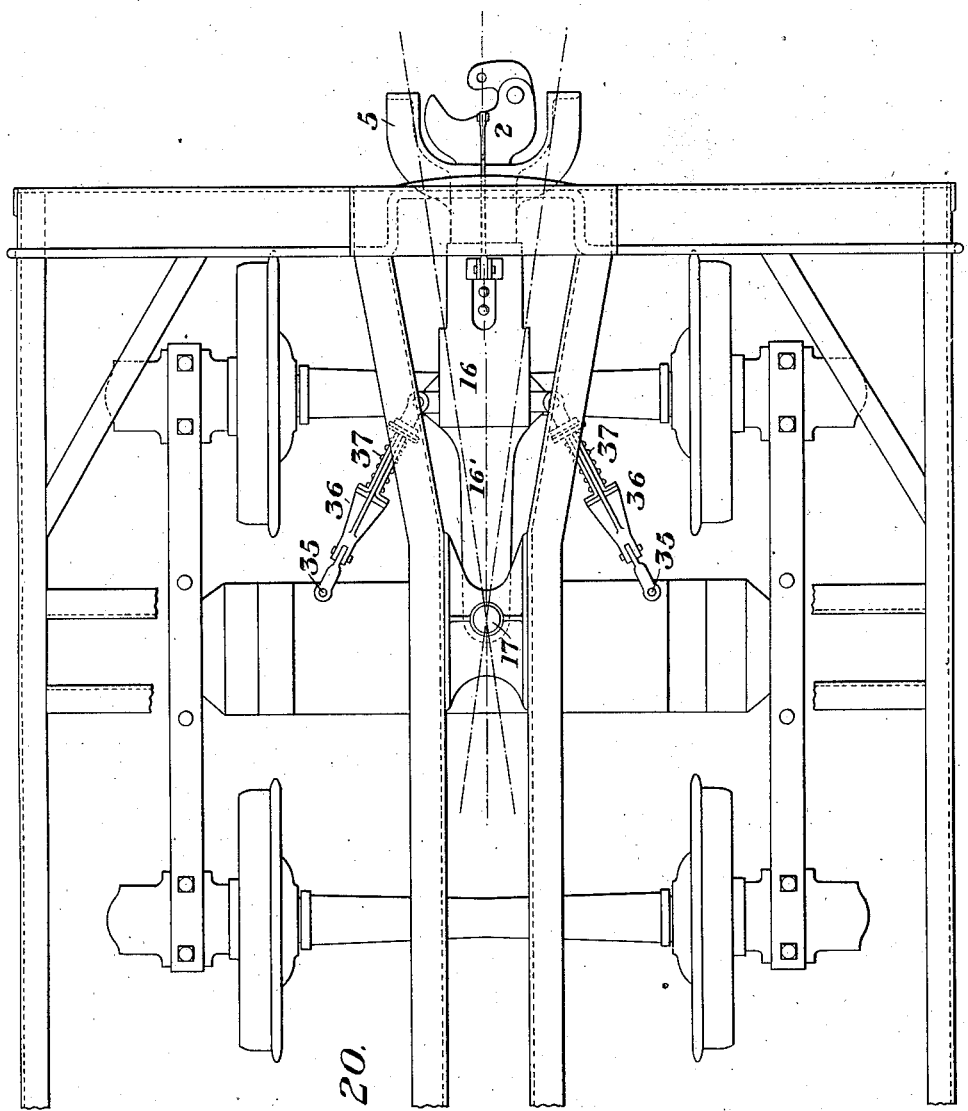

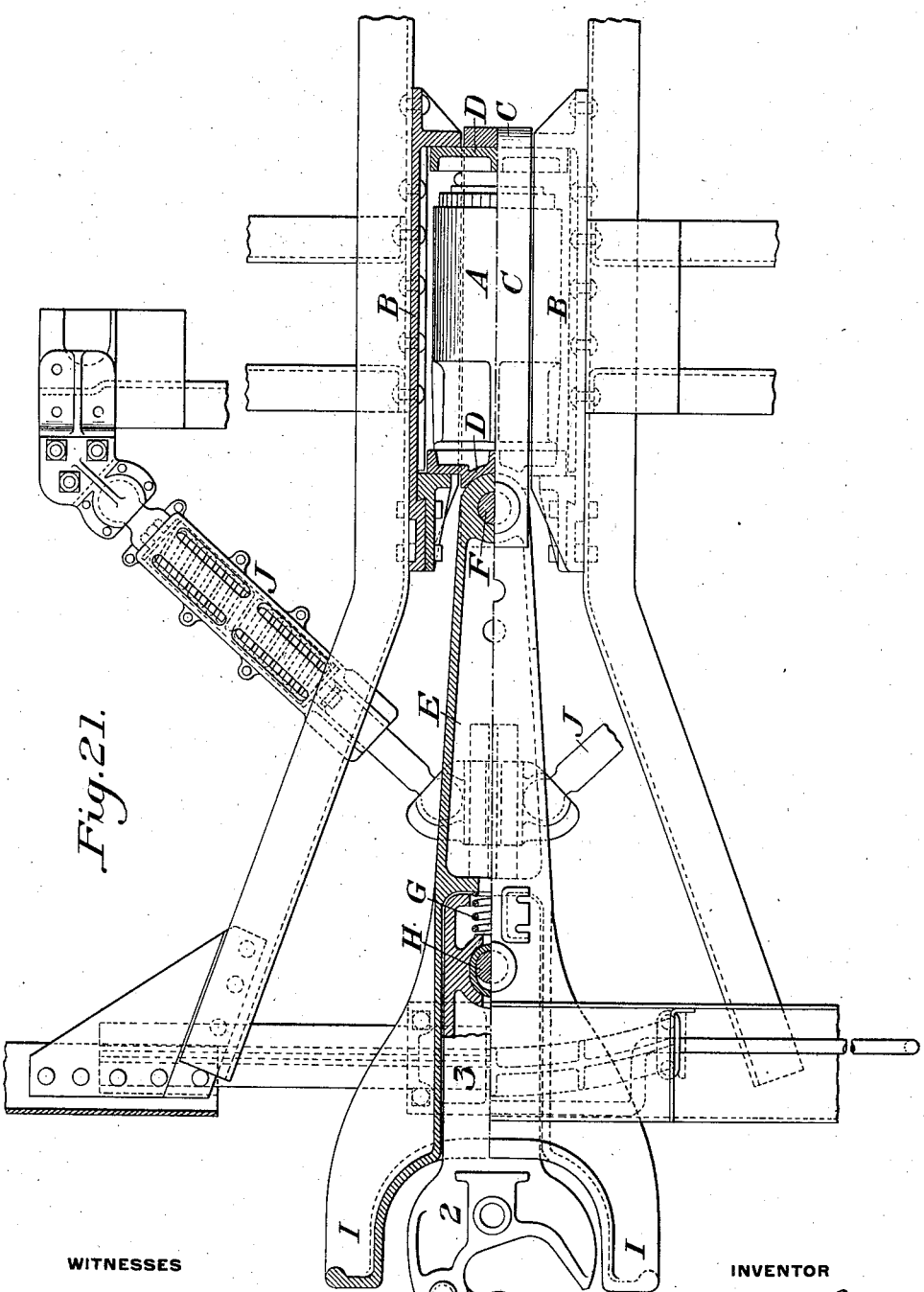

UNITED STATES PATENT OFFICE.

HENRY F. POPE, OF CLEVELAND, OHIO, ASSIGNOR TO THE NATIONAL MALLEABLE CASTINGS COMPANY, OF CLEVELAND, OHIO, A CORPORATION OF OHIO.

DRAFT-GEAR.

1,062,252. Specification of Letters Patent. Patented May 20, 1913.

Application filed April 9, 1907. Serial No. 367,170.

*To all whom it may concern:*

Be it known that I, HENRY F. POPE, a citizen of the United States, and a resident of Cleveland, in the county of Cuyahoga, State of Ohio, have invented a new and useful Draft-Gear, of which the following is a full, clear, and exact description, reference being had to the accompanying drawings, forming part of this specification, in which—

Figure 15:
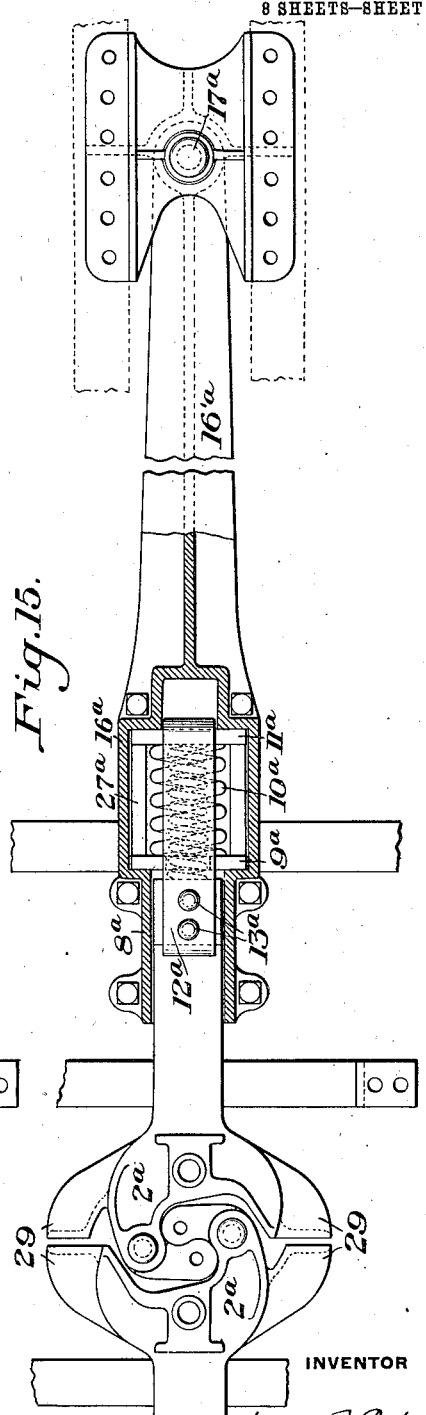
Figure 18:
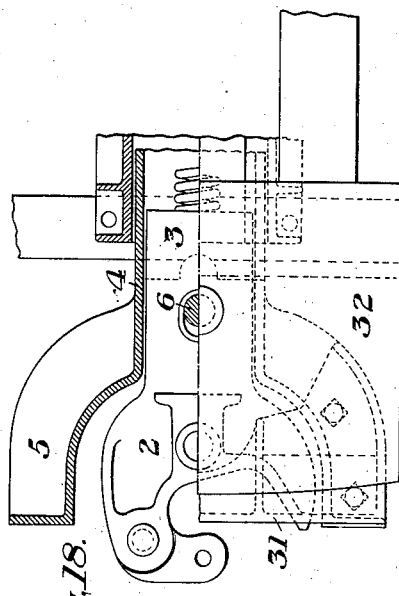
Figure 19:
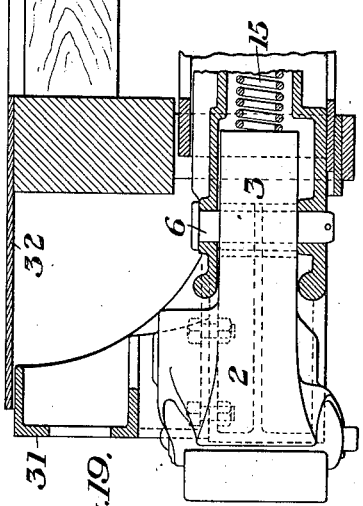
Figure 16:
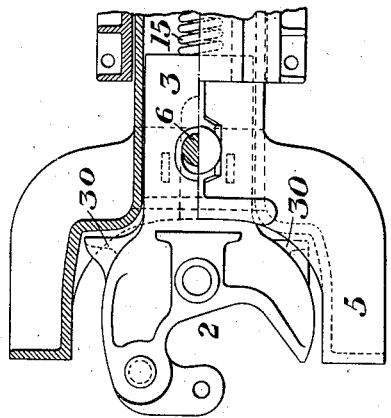
Figure 17:
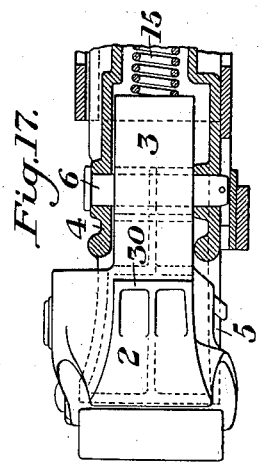

Figure 1 shows in horizontal section a draft gear constructed in accordance with my invention; Fig. 2 is a vertical longitudinal section on the line II—II of Fig. 1; Fig. 3 is an end elevation of the coupler pocket shown in Fig. 1; Fig. 4 is a vertical section on the line IV—IV of Fig. 1; Fig. 5 is a vertical section on the line V—V of Fig. 2. The figures on the second sheet of the drawings show a modification, Fig. 6 being a horizontal section; Fig. 7 a vertical longitudinal section on the line VII—VII of Fig. 6; and Fig. 8 a vertical cross-section on the line VIII—VIII of Fig. 7. Figs. 9 and 10 on the third sheet of the drawings show another modification, being respectively a longitudinal horizontal section and a longitudinal vertical section of the draft-gear. The figures on Sheet 4 of the drawings show another modification, Fig. 11 being a horizontal section, Fig. 12 a vertical section on the line XII—XII of Fig. 11, and Fig. 13 a vertical cross-section on the line XIII—XIII of Fig. 12. The figures on the fifth sheet of the drawings show further modifications, Fig. 14 being a plan view of two couplers which are stopped and connected, so as to provide against buckling in accordance with my invention; and Fig. 15 is a plan view showing a modified construction of stops. Fig. 16 is a sectional plan view showing another modification; Fig. 17 is a side elevation partly in section; and Figs. 18 and 19 are views similar to Figs. 6 and 7 showing another modification. Fig. 20 is a plan view showing the guiding connection with the truck. Fig. 21 is a plan view showing a modified construction of the device.

My invention relates to the radially swinging draft gear, which is described and claimed in the patent to H. T. Krakau, Reissue No. 12,178, dated December 1, 1903, in which a railway car is provided with a draft gear pivotally mounted at its rear end at or near the bolster of the car, adapted to swing radially on said pivot and having guiding connections with the truck. This construction is of great advantage, as stated in the said patent, but I have invented an important improvement, which maintains approximate alinement of the draft-gears and prevents liability of buckling or jackknifing which would subject the parts to strain when two cars provided with such draft-gear are coupled together and subjected to buffing or pushing stresses. This function is effected without interfering with free radial motion of the draft gears. The device which I have provided for this purpose is very simple and may be applied in various forms within the principle of the invention. It consists in providing the couplers of the opposing radially movable draft gears with stops applied to the coupler heads or coupler shanks in such manner that they will partake of the longitudinal movement of the couplers against the draft springs and when opposed to each other will engage and effectually prevent the couplers from buckling laterally. For this purpose the stops or connecting devices may be integral therewith or may be applied to the coupler-head or coupler-shank. These devices I designate in the claims under the generic term "stops", for they serve to stop the radially swinging draft-gear positively from lateral buckling.

It is preferable that the stop devices should be mounted on the coupler shank in such manner as to have a slight independent motion longitudinally, but that their main motion should be with the coupler-head and against the force of the draft-spring; and while my broader claims are not limited to the independent motion, I intend in other claims to make specific claim thereto. By thus having the stop device act upon the main draft spring, the construction is very much simplified and rendered compact, so that it can be applied without difficulty or complication to freight cars of ordinary construction as well as to passenger cars.

Referring now to the drawings in which I show the preferable forms of my invention, 2 is the coupler-head having a shank 3.

Around this shank is a coupler pocket 4, having wings 5, 5, which project forwardly at the sides of the coupler head and constitute the stops above mentioned. This pocket is provided with a vertical pin 6, which passes through a longitudinal slot 7, in the coupler-shank; and the rear of the pocket extends between the sides of the frame 16 and abuts against the forward spring follower 9 of the draft-rigging. The spring 10 is interposed between the front follower 9 and the rear follower 11, and the coupler-head is connected with the rear follower by a yoke 12 which extends forwardly therefrom and is fastened by bolts 13 to the liner block 14 of the pocket. A spring or springs 15 is interposed between the rear end of the coupler shank and a wall or stop 15' at the back of the coupler pocket 4. The coupler pocket and other parts of the draft-rigging are mounted within a frame 16, the rear shank 16' of which extends back to a point as near as convenient to the center of the bolster and is there pivoted by a vertical pivot pin 17, which permits to the draft-gear the necessary radial motion in a horizontal plane. The frame 16 has preferably a removable base-plate 26 (Fig. 8) having supporting pieces 27 which support the followers and thus center the draft-rigging within the frame.

The front end of the coupler 2 projects forward slightly beyond the end of the stops 5, so that the coupler will couple freely with the coupler of an adjacent car. When such coupling is effected and the car is subjected to a pushing or buffing force, the first effect is to move back the coupling-head 2 within the pocket 4 against the spring 15 to the slight extent which is permitted by the slot 7; and eventually the stops 5 at the outer sides of the coupler engage the corresponding stops of the opposite car. When this engagement is effected, buffing stress applied to the stops will be transmitted thereby directly to the draft-springs 10, together with the buffing stress which is applied to the coupler itself. It is clear that when the stops 5 are thus engaged with the corresponding stops of another car, the draft gears of both cars will be held and prevented from lateral buckling or jack-knifing, because the stops are laterally attached to the coupler or coupling-shank and constitute a substantial part of the draft-gear, being compelled to move with and against the pressure of the draft-spring 10. This action is enhanced by the coupler being prevented from drawing out of the pocket by reason of the pin 6, except to the slight extent permitted by the slot 7, the ends of the stops 5 being held closely against each other.

The base-plate 26 is provided with a pivot 21 for attachment to the guiding rods or connections which extend therefrom to the truck as described in the patent to Krakau above mentioned. This guiding connection is shown in Fig. 20.

35 is the truck-bolster, and 36 are telescopically constructed links which extend preferably from the pivot 21 or other part of the coupler-shank to the truck-bolster, and are provided with intermediate springs 37.

In the modification shown in Figs. 6 and 7, the construction is the same in principle as that shown in the foregoing figures, but the pocket 4 is of considerably greater cross-section than the shank of the coupler, so as to admit an ordinary coupler-shank with its yoke 12', and the yoke is attached to the coupler shank itself. Instead of the pin 6 and slot 7, I show in Figs. 6 and 7 horizontal cross-keys 18, which pass between stops 19, 20, on the shank of the coupler and have a slight lateral play so as to permit a small independent motion of the coupler-shank relatively to the pocket as explained above. These keys 18 extend through holes in the sides of the pocket as shown in Fig. 6. The rear end of the coupler shank abuts against the inner coils 10' of the draft springs, which for this purpose extend through the follower and against the rear end of the coupler shank, thus affording a small loose motion like that which is afforded by the spring 15 and slot 7 shown in Fig. 1. In Figs. 6 and 7 I also show the coupler provided above and below with guides 33 and 34. The upper guide 33 extends across the top of the coupler shank and back of the horn of the coupler, and the lower guide 34 extends below the coupler shank, both guides being attached to the coupler-pocket. These guides hold the coupler in proper place in the pocket.

In the modification shown in Figs. 9 and 10, the coupler pocket is of the same general form as that shown in Figs. 6 and 7, and the coupler shank is connected thereto in like manner by keys 18, but instead of using the inner coil of the draft spring for the purpose of permitting the independent motion of the coupler-shank, as in Fig. 6, I employ a supplemental spring 22, which is preferably applied at the back of the coupler-yoke and bears against the stop 23 on the frame of the swinging draft-gear.

In the modification shown in Figs. 11 and 12, the spring mechanism is substantially the same as the spring mechanism 10, 10' shown in Fig. 6, but instead of employing the pin and slot shown in Fig. 1, or the keys 18 shown in Figs. 6 and 7, the pocket is held from outward motion in the draft rigging by being provided at its rear end with shoulders or flanges 24, which abut against shoulders 25 at the end of frame within which the draft rigging and followers are placed. In this case the broad bearing surfaces afforded at the outer sides of the coupler prevent the draft gears from buckling or jack-knifing, and the stops 5 in buffing operate against the draft springs in the same manner as above described.

Figure 14:
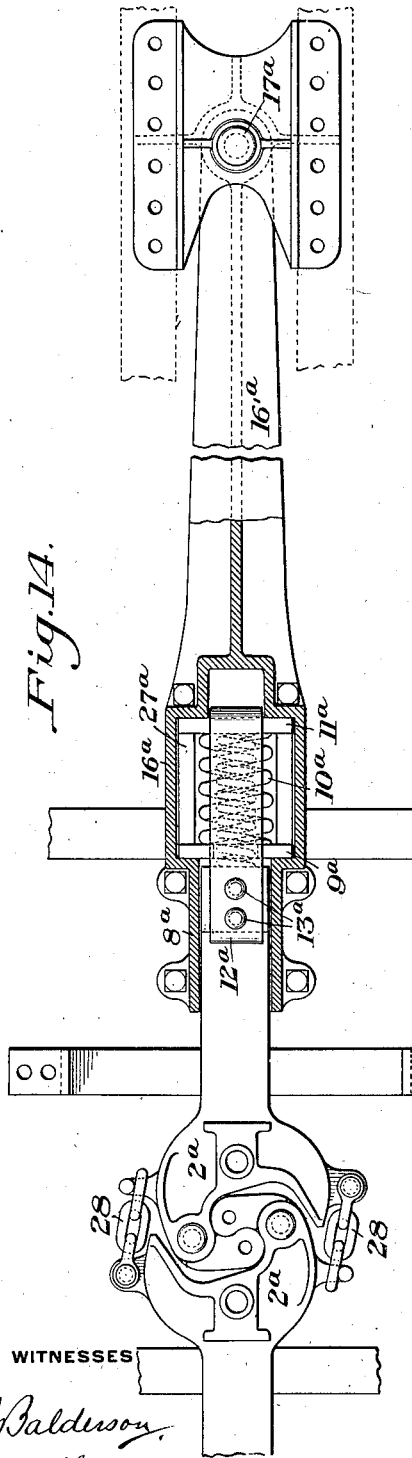

In Fig. 14 I show a simple adaptation of my invention to radial draft-gears in which the couplers of opposed cars are connected with stop-devices composed of links 28, which are secured to lugs on the outer sides of the coupler-heads, and when the cars are coupled are attached so as to connect the adjacent couplers together. When the links are thus applied they tie the couplers rigidly together and prevent the draft-gears from buckling.

In Fig. 15 I show another construction in which the coupler-head is provided with laterally projecting stops 29, adapted to engage corresponding stops on the coupler of an adjacent car or to engage the stops 5 shown in Fig. 1. When these stops of two adjacent couplers are in engagement, it is clear that the draft-gears cannot jack-knife or buckle. The stops 29 are so formed as to permit the coupler to operate with the ordinary couplers now in common use when there happens to be considerable angling of the couplers in relation to each other. In these Figs. 14 and 15 the stops are attached to the coupler directly instead of forming part of the coupler pocket in which the coupler is mounted. In these figures parts similar to those of Fig. 6 are designated by similar numerals with the letter "a" applied.

In Figs. 16 and 17 I show a construction wherein the coupler pocket is made of greater width, and the coupler-head is provided with lateral projections 30 which are adapted to engage the pocket and to form additional buffing surfaces.

In Figs. 18 and 19 I show a construction like that of Figs. 6 and 7, but a bracket 31 is bolted to the top webs of the wings or stops 5. These give additional buffing surface, and constitute a support for the platform 32 adapting the device to be used on passenger cars.

The stop device by which the draft-gears are maintained in approximate alinement should form parts of the draft-gear and should extend beyond the ordinary limits of the coupler-head. My claims are not limited to these stops when made in the form of a coupler-pocket, since they may be otherwise constituted, and they may be placed above or below the coupler and form a continuous buffer face, instead of being placed at its sides, or they may be both at the sides and top of the coupler. The parts may be otherwise modified in various ways. Thus in Fig. 21 I show a construction in which the draft-rigging A is set within the space between the draft-irons B and is provided with a yoke C and followers D, D. The front follower is preferably concave at its forward side to fit against the rear curved end of the coupler-pocket E which is connected by a vertical pin F to the arms of the yoke. This coupler-pocket has at its forward end a socket adapted to receive the shank 3 of the coupler 2, which coupler is backed by a spring G, and is connected to the socket by a vertical pin H passing through a longitudinal slot in the shank. The coupler-pocket has wings I which project forwardly at the side of the coupler-head and constitute a stop device for engaging similar stops on an adjacent car.

J, J are the guiding connections to the truck which are pivotally connected to the pocket.

When the coupler is engaged with the coupler of an adjoining car, and is subjected to buffing stress, it is moved back within the pocket against the spring G to the slight extent provided by the slot through which the pin H passes, and eventually the stops I at the outer side of the coupler engage the corresponding stops of the other car. When this engagement is effected, buffing stress applied to the stops or to the coupler, will be transmitted directly to the draft-spring, and the entire device will preserve the draft-gears in approximate alinement, which is desired.

I do not claim herein what is claimed in my application for patent for draft gear Serial No. 367,168 filed May 17, 1906.

Within the scope of my invention as above explained and as defined in the claims, those skilled in the art will be able to apply it in many other ways, and draft-springs, friction devices, &c. of other kinds may be used in connection with it, since

What I claim and desire to secure by Letters Patent is:

1. A draft member mounted to swing radially, and having a coupler and stop device adapted to maintain approximate alinement of adjacent draft members under buffing stress, said coupler being mounted to have some rearward longitudinal motion, independent of the stop device.

2. A draft member mounted to swing radially and having a coupler and guiding connections to the car truck and stops situate beyond the outer sides of the coupler head, forming part of the draft member and moving longitudinally with the draft rigging and adapted to prevent buckling of adjacent draft members under buffing stress and reinforcing the action of the guiding connections, said stops being connected to the draft rigging and adapted to move with the draft spring.

3. A draft member mounted to swing radially and having a coupler, and stops situate beyond the outer sides of the coupler-head, forming part of the draft-member and moving longitudinally with the draft rigging and adapted to prevent buckling of adjacent draft-members under buffing stress, said stops being attached to the draft rigging proper, and adapted to move with the draft spring, and permitting a slight longitudinal motion independent of the coupler.

4. A draft member mounted to swing radially, and having a coupler, stops situate beyond the outer sides of the coupler-head, forming part of the draft member and moving longitudinally with the draft-rigging and adapted to prevent buckling of adjacent draft members under buffing stress, said stops being attached to the draft rigging proper, and adapted to move with the draft spring, and permitting a slight independent longitudinal motion of the coupler, and a second spring which cushions the initial independent movement of the coupler.

5. A draft member mounted to swing radially and having a coupler with a swinging knuckle, and a coupler pocket backed by the draft spring and embracing the coupler with its forward end in position to engage a corresponding device on another car when the couplers are coupled and buffing stress is applied thereto.

6. A draft member mounted to swing radially and having a coupler with a swinging knuckle, and a coupler pocket backed by the draft spring and adapted to engage a similar device on another car, said pocket permitting a slight independent longitudinal motion of the coupler.

7. A draft member mounted to swing radially and having a coupler with a swinging knuckle, and a coupler pocket backed by the draft spring and adapted to engage a similar device on another car, and a second spring which cushions the initial movement of the coupler.

8. A draft member mounted to swing radially and having a coupler with a swinging knuckle, and a coupler pocket adapted to engage a similar device on another car.

9. A draft member mounted to swing radially and having a coupler with a swinging knuckle, and a coupler pocket abutting against the front follower of the draft rigging, and adapted to engage a similar coupler pocket on another car.

10. The combination of a radially swinging coupler pocket and a coupler mounted therein, the pocket having wings at its front end which project forwardly at the side of the coupler-head to form stops for engagement with similar devices on the pocket of an adjacent car.

11. A coupler pocket and a coupler mounted in the pocket and connected thereto so as to transmit through the pocket the force of draft, said pocket having wings at its front end which project forwardly at the sides of the coupler head to form stops for engagement with similar devices on the pocket of an adjacent car.

12. A radially swinging coupler, a stop device to preserve alinement with an adjacent coupler, and spring mechanism between the coupler and stop device.

13. The combination of a radially swinging coupler-pocket, a coupler therein, the head of the coupler being inclosed by the pocket, and a draft-spring situated back of the pocket.

14. The combination of a radially swinging coupler-pocket, a coupler therein, the head of the coupler being inclosed by the pocket, a spring backing the coupler in the pocket, and a draft-spring back of the pocket.

15. A draft gear having a radially swinging coupler-pocket with a coupler mounted therein, the head of the coupler being inclosed by the pocket, stops rigidly connected with the coupler-pocket and situated beyond the outer sides thereof, spring mechanism back of the pocket, and guiding connections between the pocket and car-truck.

16. A draft member mounted to swing radially and having a coupler and guiding connections to the car truck, and stops situate beyond the outer sides of the coupler head, forming part of the draft member and moving longitudinally with the draft rigging, said stops being connected to move simultaneously without any longitudinal movement independently of each other, to prevent buckling of adjacent draft members under buffing stress, and reinforcing the action of the guiding connections, said stops being connected to the draft rigging and adapted to move with the draft spring; substantially as described.

17. The combination of a radially swinging coupler pocket and a coupler mounted thereon, the pocket having wings at its front end which project forwardly at the side of the coupler head to form stops for engagement with similar devices on the pocket of an adjacent car, said stops being connected to move simultaneously, without any longitudinal movement independently of each other; substantially as described.

In testimony whereof, I have hereunto set my hand.

HENRY F. POPE.

Witnesses:
 CHAS. E. POPE,
 HARRY E. ORR.